Jan. 9, 1951        R. D. PARRY        2,537,235
FISHING CORK
Filed Aug. 16, 1946
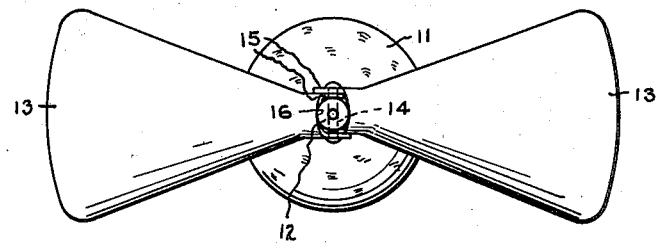
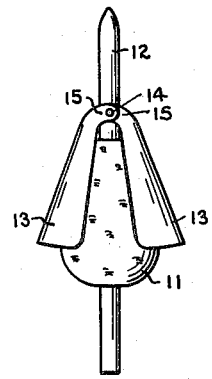 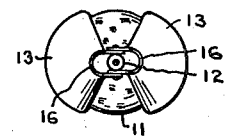 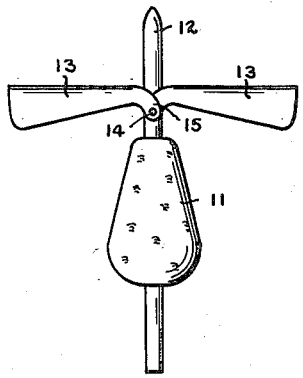
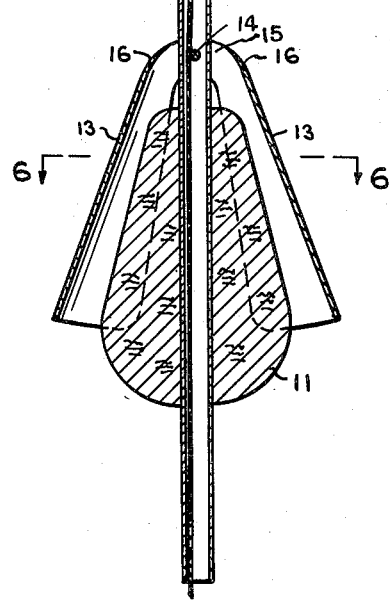
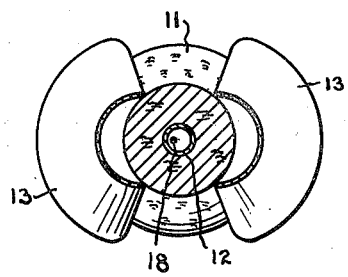
INVENTOR.
ROBERT D. PARRY.
BY
*H.C. Kavel.*
ATTORNEY.

Patented Jan. 9, 1951

2,537,235

UNITED STATES PATENT OFFICE 2,537,235

FISHING CORK

Robert D. Parry, Cincinnati, Ohio

Application August 16, 1946, Serial No. 690,958

1 Claim. (Cl. 43—44.90)

This invention relates to an improved floating fishing cork having novel means to impede the movement of the lure as a fish starts to run with it comprising members attached to the cork and movable to a transverse plane and acting as a brake on the line to firmly hook the fish. As the line is pulled in the members collapse about the cork permitting easy withdrawal of the line from the water.

The object of my invention is to provide a fishing cork with hinged members normally resting on the sides of the cork and upon downward movement of the cork the members will move outwardly to impede the continued movement of the cork.

My invention will be further readily understood from the following description and claim and from the drawings, in which latter:

Fig. 1 is a plan view of my improved cork, with the members extended.

Fig. 2 is a side view, with the members collapsed.

Fig. 3 is a plan view, with the members collapsed.

Fig. 4 is a side view, with the hinged members extended.

Fig. 5 is a longitudinal sectional view of my improved cork showing a fishing line extending therethrough.

Fig. 6 is a horizontal sectional view of the same, taken in the plane of the line 6—6 of Fig. 5.

My improved fishing cork comprises a floatable cork 11 suitably mounted on a hollow stem 12 through which the fishing line is attached in the usual manner as by a knot 17 in the line 18 bearing against the upper end of the stem 12. A pair of members 13 are hinged to the stem 12 by means of a pin 14 extending through lips 15 on the members 13 and the stem 12.

The members 13 are loosely hinged to the stem 12 and normally rest on the cork. These members are shaped to conform to the contour of the cork. When a fish takes the bait and starts to run with it, the members 13 spread out and form a delayed brake or resistance to the movement of the bait and has the same effect as jerking the line to hook the fish. The outward movement of the members 13 is limited by the faces 16 engaging the stem 12.

Having thus fully described my invention, what I claim as new and desire to secure by Letters Patent, is:

A fishing cork comprising a stem, a floatable member fixed to said stem, a pin extending through said stem above said floatable member, and a pair of members pivotally mounted on said pin at one end so that the free ends of said members are normally positioned below the hinge axis and said members normally rest on said floatable member, said pair of members being adapted to move to a transverse plane to offer delayed resistance to said floatable member upon movement of said floatable member through water in the direction of the free ends of said members when they are normally resting on the floatable member.

ROBERT D. PARRY.

REFERENCES CITED

The following references are of record in the file of this patent:

UNITED STATES PATENTS

| Number | Name | Date |
|---|---|---|
| 1,874,102 | Jacobs | Aug. 30, 1932 |
| 2,153,339 | Reeves et al. | Apr. 4, 1939 |
| 2,234,243 | Goertzen | Mar. 11, 1941 |
| 2,302,549 | Hodges | Nov. 17, 1942 |